July 31, 1973   S. L. ISRAEL   3,749,640
NUCLEAR REACTOR HAVING IMPROVED COOLANT REFLECTING ARRANGEMENT
Filed June 2, 1970   2 Sheets-Sheet 1
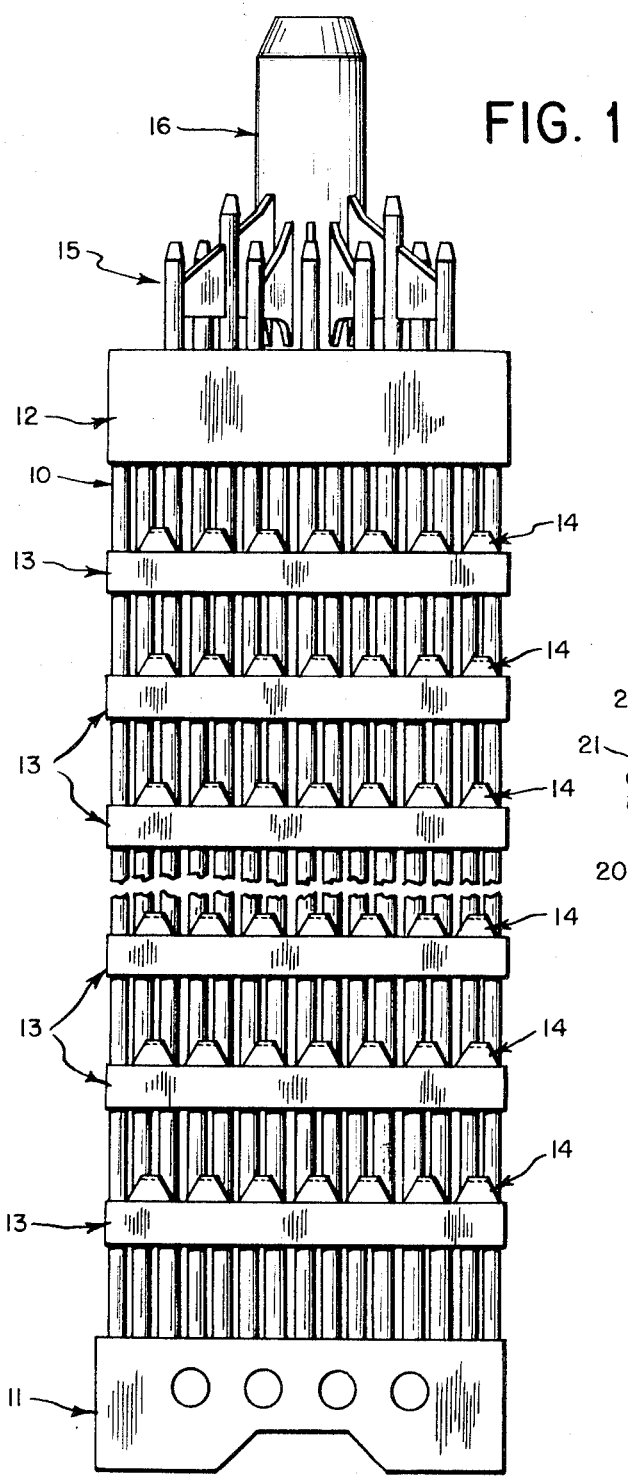
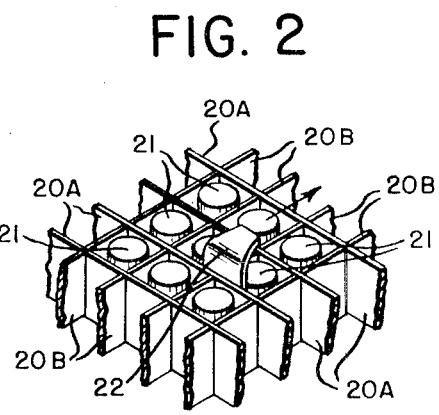
INVENTOR
Sanford L. Israel
BY
ATTORNEYS

United States Patent Office 3,749,640
Patented July 31, 1973

3,749,640
NUCLEAR REACTOR HAVING IMPROVED
COOLANT REFLECTING ARRANGEMENT
Sanford L. Israel, Hartsdale, N.Y., assignor to United
Nuclear Corporation, Elmsford, N.Y.
Filed June 2, 1970, Ser. No. 42,827
Int. Cl. G21c 15/04
U.S. Cl. 176—78　　　　　　　　　　　　　　　5 Claims

ABSTRACT OF THE DISCLOSURE

In a liquid-cooled nuclear reactor, coolant deflectors are deployed in a pattern for deflecting the coolant into transverse flow streams which are parallel to the transverse power gradient among adjacent assemblies. In typical pressurized water reactors, these streams are concentric with respect to the intersection of adjacent nuclear fuel assemblies and are oriented so that adjacent concentric streams flow in opposite directions. This deployment of deflectors permits the operation of a reactor at a power level surprisingly higher than can be obtained from using coolant deflector deployments heretofore devised.

BACKGROUND OF THE INVENTION

This invention relates to nuclear reactor fuel assemblies including coolant deflectors deployed in a pattern for permitting operation of the reactor at an increased power level.

Nuclear reactors are the principal means for converting the large amounts of energy released by nuclear fission into the useful thermal energy. When a fissionable atom such as $U^{233}$, $U^{235}$, $Pu^{239}$, or $Pu^{241}$ absorbs a thermal neutron, there is a high probability that it will undergo nuclear fission, splitting into two fission products of lower atomic weight having great kinetic energy and emitting a number of neutrons. In a nuclear reactor, the kinetic energy of the fission products is dissipated as heat in the nuclear fuel elements and removed from the reactor by a coolant in heat exchange relationship with the fuel elements. The fission neutrons are slowed down to the thermal range by a moderator and, in turn, used to induce a subsequent fission in another atom in order to keep the reaction self-sustaining.

A typical commercial power reactor comprises, in essence, a reactor pressure vessel and a nuclear chain reacting core made up of a number of nuclear fuel element assemblies. Each fuel assembly comprises a parallel array of rod-type nuclear fuel elements—typically zirconium alloy tubes filled with enriched uranium oxide. The fuel rods in each assembly are accurately spaced from each other throughout their lengths by one or more grid structures intermediate their ends. Typically each individual fuel rod passes through a corresponding grid cell in contact with suitable bearing surfaces disposed therein.

The reactor core is typically cooled and moderated by water pumped through the core. More specifically, water is pumped into each assembly through nozzles at the bottom and circulates in a generally longitudinal direction with respect to the fuel rods (through subchannels formed by adjacent rods) to a top nozzle through which it leaves the assembly to produce steam for driving a turbine.

One of the primary problems associated with nuclear power reactors is the problem of inefficient reactor operation due to excessive heating in a relatively small proportion of the subchannels. Despite a wide variety of fuel distribution schemes designed to obtain uniform heating, certain fuel rods in the reactor core tend to operate at higher temperatures than do others. Because of this uneven heating, the coolant enthalpy rise and/or temperature rise varies from subchannel to subchannel. As is well known in the nuclear reactor art, the power output level of an entire reactor core is limited to a level at which the enthalpy or temperature rise in the hottest subchannel in the core.

It has been suggested that this uneven heating be compensated for by the use of means for transversely mixing the longitudinally flowing coolant. This transverse mixing is accomplished, for example, by mixing vanes which protrude into the subchannels and deflect the coolant flow in a transverse direction, thereby producing a mixture of the coolant among the longitudinal flow channels. Thus, the coolant in a flow channel having a higher enthalpy and/or temperature is mixed with the coolant in another flow channel having a lower enthralpy and/or temperature to produce a mixture having an intermediate enthalpy and/or temperature.

SUMMARY OF THE INVENTION

In accordance with the invention, reactor coolant deflectors are deployed in a pattern for deflecting the reactor coolant into transverse flow streams which are parallel to the transverse power gradient among adjacent fuel assemblies. In typical pressurized water reactors, these streams are concentric with respect to the intersection of adjacent fuel and are oriented so that adjacent concentric streams flow in opposite directions. This deployment of deflectors permits the operation of a reactor at a power level surprisingly higher than can be obtained using coolant deflector deployments heretofore devised.

BRIEF DESCRIPTION OF THE DRAWINGS

The nature, features, and advantages of the present invention will appear more fully upon consideration of the illustrative embodiment of the invention now to be described in detail in connection with the accompanying drawings.

In the drawings:

FIG. 1 is a longitudinal view of a typical fuel assembly, adapted for use in a pressurized water reactor, which can utilize a coolant flow deflecting arrangement in accordance with the invention;

FIG. 2 is an isometric view of a portion of a fuel assembly grid showing an example of a coolant deflector useful in accordance with the invention;

DETAILED DESCRIPTION

Figure 3:
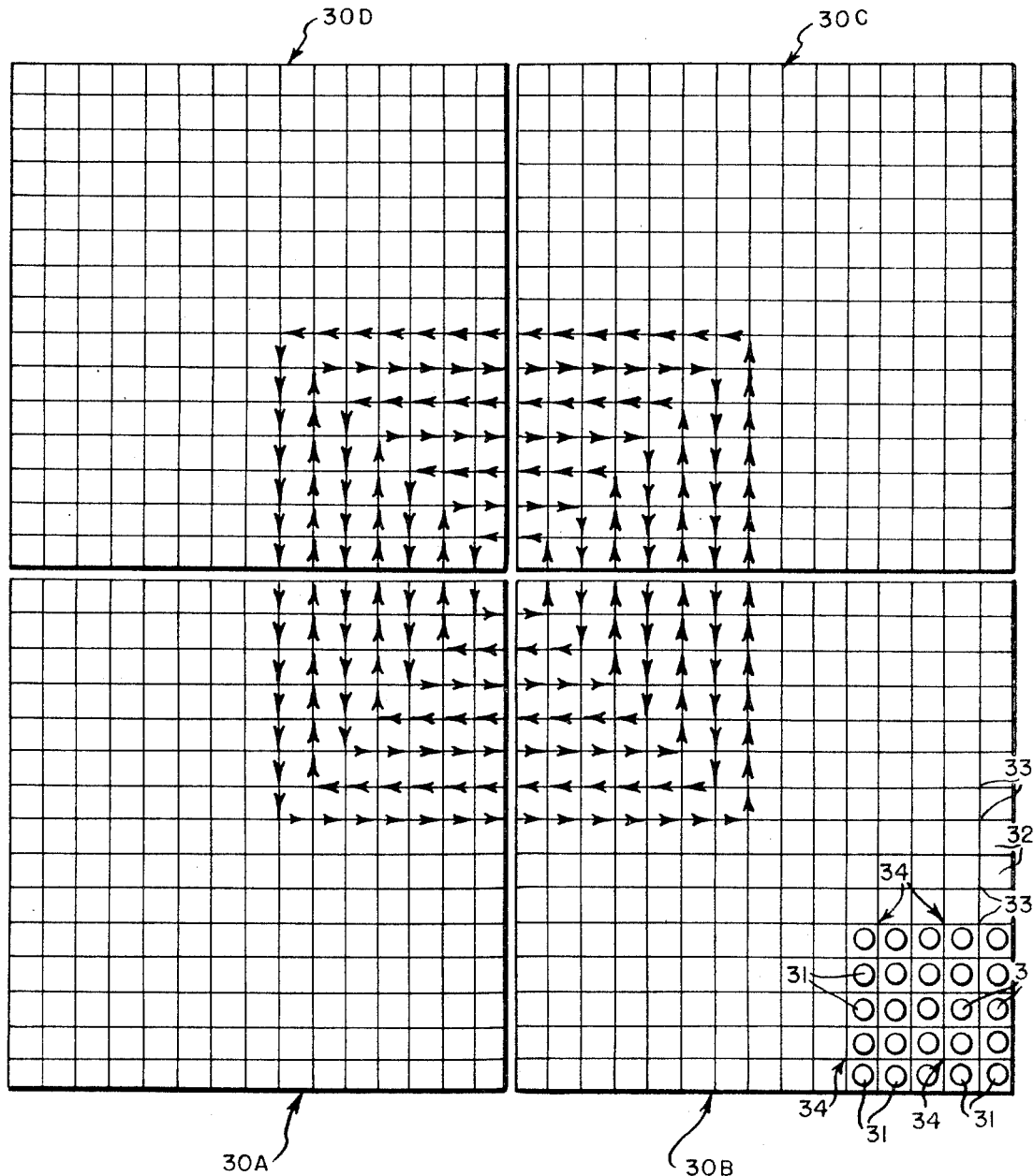
FIG. 3 is a partially sectional elevational view, with parts broken away for clarity, of a fuel assembly including a coolant flow deflecting arrangement in accordance with the invention.

FIG. 1 shows a longitudinal view of a nuclear fuel assembly comprising a 15 x 15 array of rods 10. The array extends between a bottom nozzle 11 for acting as a lower support structure and directing the flow of water through the array and an upper nozzle 12 for directing the heated water into the reactor exit conduits. At various intermediary positions, the rods are spaced apart and laterally supported by spring clip grids 13. (Nine grids are used in a typical rod assembly having a total length of 161 inches.) The grids are made of a strong corrosion resistant material such as Inconel and can be adapted to include coolant deflectors 14 which will be described in greater detail below.

Above the top of upper nozzle 12 is the upper portion of an assembly of control rods 15 fastened together at the top by a common hub or spider arrangement 16. The control rods are composed of a thermal neutron absorbing material such as a cadmium alloy and are conveniently sealed in stainless steel tubes.

Typically the 15 x 15 array comprises one hollow rod for in-core instrumentation, twenty control rods, and two hundred and four fuel rods. The fuel rods are typically sealed zirconium alloy tubes filled with pressed ceramic pellets of enriched uranium oxide. Sufficient void volume and clearances are provided within the rod to accommodate fission gases released from the fuel, differential thermal expansion between the tube cladding and the fuel, and the fuel swelling due to accumulated fission products without overstressing of the cladding or seal welds. For example, the cladding can comprise Zircaloy-4 tubes having a thickness of 0.0243 inch and an outside diameter of 0.422 inch. The fuel pellets can have a 0.3669 inch diameter, a 0.6 inch length and a density of between 93 and 94 percent of theoretical density.

A typical assembly is on the order of 8.426 inches on a side and the centerline-to-centerline pitch between rods is about 0.563 inch.

FIG. 2 is an isometric view of a portion of one of the fuel assembly grids showing an example of a coolant deflector useful in accordance with the invention. As can be seen from the drawing, the spacer grid is formed by two intersecting sets 20A and 20B of strip plates such that the plane surfaces of each set are disposed parallel to each other. Each cell formed by the intersecting strips contains one of the assembly rods 21 (shown cut away), and each set of adjacent rods forms a subchannel centered at the lines of intersection of the strip plates. It is through these subchannels that the coolant naturally tends to flow. A suitable coolant deflector, for use in accordance with the invention, comprises a mixture vane 22 which can, for example, be formed along the longitudinal margins of the strip plates at locations adjacent the lines of intersection. The vane is thus disposed in the coolant subchannel formed by adjacent rods.

The vane is displaced from the plane of the strip plate from which it projects toward the opening to an adjacent subchannel so that it transversely deflects some of the longitudinally flowing coolant into the adjacent subchannel. The angle of displacement is typically between 20° and 40° and is preferably on the order of 30°. In an alternative structure, the vane is disposed so that it projects out from the bottom of the grid. In this latter case, the coolant flow is displaced in the direction opposite the displacement of the vane.

Clearly a plurality of such vanes or similar deflectors can be deployed at various positions on the grid to achieve a desired transverse coolant flow pattern.

FIG. 3 is a schematic illustration of an arrangement of coolant deflectors in accordance with one embodiment of the invention. The drawing represents a cluster of four nuclear reactor fuel assemblies 30A, 30B, 30C, and 30D. Each assembly comprises a 15 x 15 array of rods 31 (only a few of which are shown) disposed in an array of grid cells 32. Each of the grid intersections 33 is centered in a coolant subchannel 34 between adjacent rods. The coolant deflectors are represented by arrows from the grid intersections pointing in the direction they displace the coolant. While not all of the deflectors have been placed in the drawing, enough are shown to make clear the pattern of deployment.

As can be seen from the drawing, the deflectors are deployed concentrically with respect to the intersections of adjacent fuel assemblies in order to displace the coolant in similar transverse patterns as it moves from the input nozzle to the outlets. In addition, it will be noted that the deflectors are so oriented that adjacent streams of coolant are deflected in opposite directions around the assembly intersection.

In a typical pressurized water reactor, this deployment results in a coolant flow which is parallel to the power gradient among adjacent assemblies. There is a concentric region of high powered rods (having powers above average for the assembly) in each fuel assembly. The hottest and, therefore, limiting channel will be found in the high powered region. Adjacent fuel assemblies will have different power levels with the hottest channel being in the highest powered assembly. The net result is that the deflector pattern moves cool fluid into and hot fluid out of the concentric high powered region in an assembly and, in addition, moves cool fluid into and hot fluid out of the highest powered assembly.

This deployment of coolant deflectors has been found to produce a remarkable improvement in reducing the temperature difference between coolant leaving the reactor through "hot" subchannels and coolant leaving through average subchannels. The deployment commonly used in prior art reactors—which, in essence, swirls the coolant through the four subchannels adjacent each fuel rod—was found to reduce this temperature difference to about 75 percent of the temperature difference with no deflectors. The deployment of the same deflectors in accordance with the invention reduced this temperature difference to less than 10 percent of the temperature difference using no deflectors.

It is understood that the above-described arrangements are merely illustrative of the many possible specific embodiments which can represent applications of the principles of the invention. For example, a wide variety of coolant deflectors or other means for displacing the reactor coolant in a direction transverse to the assembly can be easily designed. Thus, numerous and varied other arrangements can be readily devised by those skilled in the art without departing from the spirit and scope of the invention.

What is claimed is:

1. In a plurality of adjacent rod-type nuclear fuel assemblies for use in a liquid-cooled nuclear reactor, each assembly comprising a plurality of nuclear fuel rods spaced apart by at least one intermediate spacer grid and having a plurality of coolant deflectors secured to said intermediate spacer grid for transversely displacing the flow of coolant among subchannels formed by adjacent rods in predetermined displacement directions, the improvement wherein said coolant deflectors are deployed in a pattern wherein the predetermined displacement directions thereof are oriented concentrically with respect to the intersections of adjacent fuel assemblies, thereby defining concentric flow paths around said intersections.

2. A plurality of adjacent fuel assemblies according to claim 1 wherein said coolant deflectors are deployed in a pattern wherein adjacent concentric flow paths are oriented in alternating circumferential directions around said intersections.

3. A plurality of adjacent fuel assemblies according to claim 2 wherein the coolant deflectors are secured to said intermediate spacer grid in the subchannels between adjacent fuel rods.

4. In a rod-type nuclear fuel assembly for use in a plurality of adjacent assemblies in a liquid-cooled nuclear reactor comprising a parallel array of elongated fuel rods spaced apart by at least one intermediate spacer grid, adjacent ones of said fuel rods defining coolant flow subchannels through said assembly, and a plurality of coolant deflectors secured to said intermediate spacer grid for transversely displacing the flow of coolant among said subchannels in predetermined displacement directions, the improvement wherein said coolant deflectors are deployed in a pattern wherein the predetermined displacement directions thereof are oriented concentrically with respect to intersections of adjacent assemblies.

5. A plurality of adjacent fuel assemblies according to claim 1 wherein said liquid-cooled nuclear reactor is a pressurized water reactor.

References Cited

UNITED STATES PATENTS

| | | | |
|---|---|---|---|
| 3,344,855 | 10/1967 | Clark | 176—78 X |
| 3,393,128 | 7/1968 | Obertelli et al. | 176—81 X |
| 3,395,077 | 7/1968 | Long Sun Tong et al. | 176—81 X |
| 3,439,737 | 4/1969 | Boorman et al. | 176—76 X |

FOREIGN PATENTS

| | | | |
|---|---|---|---|
| 438,510 | 12/1967 | Switzerland | 176—78 |
| 1,244,981 | 7/1967 | Germany | 176—78 |
| 1,439,362 | 4/1969 | Germany | 176—78 |

REUBEN EPSTEIN, Primary Examiner

U.S. Cl. X.R.

176—64, 76, 81